United States Patent [19]

Fleming et al.

[11] Patent Number: 4,767,429
[45] Date of Patent: Aug. 30, 1988

[54] GLASS BODY FORMED FROM A VAPOR-DERIVED GEL AND PROCESS FOR PRODUCING SAME

[75] Inventors: James W. Fleming, Fanwood; Sandra A. Pardenek, Westfield, both of N.J.

[73] Assignee: American Telephone & Telegraph Co., AT&T Bell Laboratories, Murray Hill, N.J.

[21] Appl. No.: 940,393

[22] Filed: Dec. 11, 1986

[51] Int. Cl.$^4$ .................. C03B 37/00; C03C 25/02
[52] U.S. Cl. .................... 65/3.11; 65/3.12; 65/18.1; 65/18.2; 65/900; 65/901; 65/DIG. 16; 423/331; 501/12
[58] Field of Search ............ 65/901, 900, DIG. 16, 65/18, 18.1, 18.3, 18.4, 33, 17, 18.2, DIG. 16.31, 2, 3.11, 3.12; 423/331, 501, 12

[56] References Cited

U.S. PATENT DOCUMENTS

| | | | |
|---|---|---|---|
| 3,764,286 | 10/1973 | Antczak et al. | 65/32 |
| 3,800,031 | 3/1974 | Sale et al. | 423/338 |
| 3,954,431 | 5/1976 | Fleming, Jr. et al. | 65/18 |
| 4,282,196 | 8/1981 | Kometani | 423/337 |
| 4,417,910 | 11/1983 | Passaret | 65/18.2 |
| 4,419,115 | 12/1983 | Johnson et al. | 65/312 |
| 4,477,580 | 10/1984 | Fleming, Jr. | 501/12 |
| 4,530,709 | 7/1985 | Ogawa | 65/900 |
| 4,595,578 | 6/1986 | Cohen et al. | 423/338 |
| 4,645,524 | 2/1987 | Bocko et al. | 65/DIG. 16 |

FOREIGN PATENT DOCUMENTS

2178020 2/1987 United Kingdom .................. 501/12

OTHER PUBLICATIONS

"Better Ceramics through Chemistry", *Materials Research Society Symposia Proc.*, vol. 32, Uhlmann et al., Feb. 1984, pp. 59–70.

*Treatise on Materials Science and Technology*, vol. 22, Academic Press, Sumio Sakka, 1982, pp. 129–167.

"Soluble Silicates", *ACS Symposium Series*, American Chemical Society, Klein et al., Aug. 26-27, 1981, pp. 294–304.

"A Novel High-Rate Fabrication Process for Optical Fiber Preforms", *Fourth International Conf. on Integrated Optics and Optical Fiber Communication*, Technical Digest, Sudo et al., Jun. 27-30, 1983.

*Primary Examiner*—David L. Lacey
*Assistant Examiner*—Lori-Ann Johnson
*Attorney, Agent, or Firm*—Eugen E. Pacher

[57] ABSTRACT

The disclosed simple, economical and rapid sol-gel process for forming a silica-based glass body, termed the "vapogel" process, comprises introduction of a silicon halide-containing gas (e.g., $SiCl_4+O_2$) into an aqueous medium. The thus formed sol can gel within minutes, resulting in a monolithic gel from which particles having a narrow size distribution can easily be formed. The thus formed particles can be used to produce a glass body such as an optical fiber. Various techniques for forming the glass body from the gel are disclosed. Among the many advantages of the vapogel method are its ability to produce very homogeneous mixed oxide glasses of composition not obtainable by prior art sol-gel processes, and the advantageous mechanical properties of the gel produced by the method. The latter makes possible, inter alia, formation of particles having a relatively narrow size distribution.

21 Claims, 5 Drawing Sheets

GLASS BODY FORMED FROM A VAPOR-DERIVED GEL AND PROCESS FOR PRODUCING SAME

FIELD OF THE INVENTION

This invention pertains to a method for forming silica-containing glass using precursor material produced by a sol-gel process, and to glass bodies produced by the method.

BACKGROUND OF THE INVENTION

Much effort has recently been expended on producing glass by sol-gel processes. For a recent partial review of the field, see, for instance, D. R. Uhlmann et al, in *Better Ceramics Through Chemistry*, Materials Research Society Symposia Proceedings, Vol. 32, C. J. Brinker et al, editor, (1984), pp. 59–70.

Sol-gel methods for producing glass precursor material can be divided into techniques that form a gel using pre-existing colloidal particles (e.g., fumed silica), and into techniques that form a gel by hydrolization and polymerization of appropriate chemical compounds. This application is concerned with techniques in the latter category, and with a combination of the two techniques. The techniques of concern herein will be collectively referred to as "polymerization" techniques.

Polymerization techniques may result in gel formation even though a classical sol may not have been formed in the process. It is customary, however, to refer to these processes as sol-gel processes. Typically, gels formed by polymerization techniques are among the monolithic gels. Such a gel may be pictured as a continuous molecular network, having a sponge-like structure, with liquid occluded in the interstices of the "sponge".

Prominent among the known polymerization techniques is the alkoxide method, which is reviewed, for instance, by S. Sakka, *Treatise on Material Science and Technology*, Vol. 22, Academic Press (1982), pp. 129–167. See also L. C. Klein et al, *Soluble Silicates*, ACS Symposium Series, Vol. 194, American Chemical Society (1982), pp. 293–304.

Briefly, the alkoxide method comprises mixing an alkoxide, typically a silicon alkoxide such as tetraethylorthosilicate (TEOS), an alcohol such as ethanol, and water. An electrolyte such as HCl or $NH_4OH$ may also be added. Mixing of the components results in formation of a clear "sol", with hydrolysis occurring rapidly, followed by polymerization, a result of which is increasing viscosity of the sol, with the viscous sol becoming an elastic gel in which all of the liquid phase is occluded by a substantially continuous network of the solid phase. Typically, the gel is dried, resulting in formation of a porous, relatively rigid solid, which can be transformed into a glass by sintering at a temperature substantially below the conventional softening temperature of the glass. If desired, adsorbed water and hydroxyl ions can be removed, prior to or during sintering, by means of a known chlorine treatment. The alkoxide process can be used to produce doped high-silica glass and some mixed oxide glasses, provided the dopants or other necessary constituents are available in alkoxide form or in the form of water or alcohol-soluble salts.

Various techniques are known for producing a glass body from material produced by the alkoxide method. Among these techniques are the double dispersion method of U.S. Pat. No. 4,419,115, and the particle fusion technique of U.S. Pat. No. 3,954,431, incorporated herein by reference, both co-assigned with this. See also S. Sudo et al, *Technical Digest, Fourth International Conference on Integrated Optics and Optical Fiber Communication*, Tokyo (1983), 27A3-4. The technique of the '431 patent comprises forming a glass body of fusing alkoxide-derived glass particles to a glass substrate by means of an oxygen plasma torch.

Among the advantages of the alkoxide process are its relatively low processing temperatures and its potential for economical production of high purity glass. The conventional alkoxide process also has several shortcomings. For instance, it is frequently difficult to produce chemically homogeneous doped or mixed oxide glasses by means of the alkoxide process. In such multicomponent glass systems, homogeneity generally can be achieved only if the hydrolization rates of all precursor materials are substantially the same. This, however, is rarely the case. In order to deal with this problem, methods for prehydrolyzing slowly hydrolyzing species have been proposed. Use of such methods complicates the overall process; and, despite their use, controlled gelation is generally difficult to achieve in multi-component systems. A further technique for dealing with different hydrolization rates of precursor materials is disclosed in U.S. Pat. No. 4,477,580.

Among other shortcomings of the alkoxide process is the requirement that all precursor materials be in solution. However, some important precursors (e.g., TEOS) are substantially insoluble in water. Therefore, it is frequently required to add an otherwise unnecessary constituent (e.g., ethyl alcohol) to the system, to facilitate dissolution. Furthermore, alkoxides typically are synthesized from simpler metal halides, e.g., $SiCl_4$. Such processing obviously results in a product that is more costly, and frequently is less pure, than the starting metal halide. The alkoxide process also typically is relatively difficult to control reliably, since a host of parameters (e.g., pH, temperature, pressure, volume, composition, catalyst, degree of agitation, and sequence and rate of combination) all affect the outcome. Another disadvantage is the often excessively long gelation time, which can be, in some circumstances, days to weeks, and rarely is less than several hours.

Among the articles that can potentially comprise a sol/gel-derived glass body is optical fiber drawn from a fiber preform. Such fiber typically is silica-based and comprises a core contactingly surrounded by a cladding, with the former having a higher refractive index than the latter to achieve guiding of electromagnetic radiation of an appropriate wavelength, e.g., in the range of 0.7–1.6 $\mu m$. The refractive index difference is produced, for instance, by incorporating an up-dopant (a dopant which increases the refractive index, e.g., $GeO_2$) into the core region and/or incorporating a down-dopant (a dopant which decreases the refractive index, e.g., fluorine) into the cladding.

Other examples of articles that can potentially comprise a sol/gel-derived glass body are lenses and prisms, and high silicas glass tubes such as are used as substrate tubes in the MCVD process and in many other industrial processes, e.g., in semiconductor processing.

In view of the potential advantages of producing glass by a sol/gel process, a method for forming a monolithic gel that is free of many of the shortcomings of the prior art polymerization processes, especially of the alkoxide process, would be of great significance. This application discloses such a method.

SUMMARY OF THE INVENTION

We are disclosing a polymerization technique for forming silica-containing gel that can use a relatively inexpensive precursor material that is available is extremely pure form. The inventive technique can produce very rapid gelation, generally is relatively insensitive to such parameters as temperature, volume, pH, and degree of agitation, permits formation of extremely homogeneous silica-containing gels (including such gels having compositions unattainable by prior art polymerization techniques), and results in a gel having properties that make it suitable for partitioning by simple means to result in particles of a predetermined average size and having a narrow size distribution.

The invention provides a convenient method for producing a glass body, including a glass body of nonuniform refractive index such as an optical fiber preform or an optical fiber. Such glass bodies can be produced by consolidation of a porous gel-derived body, by accretion of gel-derived particles, or by any other appropriate technique, e.g., by extrusion from a crucible. The inventive method can make possible production of gel-derived glass that typically is not subject to "bloating" during high temperature processing, e.g., during fiber drawing.

The novel polymerization technique for forming silica-containing gel, to be referred to as the "vapogel" technique, comprises introducing a gas stream comprising one or more metal halides (at least one of which is a silicon halide) into an aqueous medium such that a silicon-containing gel is formed.

In one exemplary embodiment of the inventive glass-forming method, substantially dry, porous, silica-containing particles are produced from the thus produced gel by, e.g., partitioning of the gel by pushing it through a screen (the resulting particles typically are approximately equiaxed) and drying of the resultant gel particles. The dry porous particles can be consolidated at elevated temperature, such that homogeneous glass particles are formed. From the thus produced glass particles (or from the dry porous particles) a glass body is formed by, e.g., plasma fusion or by extrusion. In another exemplary embodiment of the inventive method, the gel is not partitioned into particles. Instead, a gel body of predetermined shape and size is produced, and the gel body is then dried and consolidated, resulting in a glass body of desired shape and dimensions.

The gas introduced into the aqueous medium comprises one or more silicon halides (e.g., $SiCl_4$, $SiF_4$, $SiCl_{4-x}F_x$, $SiBr_4$, $SiI_4$), and furthermore may comprise one or more other metal halides (preferably metal chlorides such as $PCl_3$, $BCl_3$, $GeCl_4$, $SnCl_4$, $TiCl_4$, $ZnCl_4$, $PbCl_2$, or $SbCl_3$, but not excluding fluorides, iodides, or bromides). It typically also comprises one or more carrier gases such as $O_2$, He, Ar, or $N_2$.

The aqueous medium may contain water soluble salts (e.g., aluminum nitrate or chloride, tin chloride, sodium chloride ammonium phosphate, sodium carbonate, ammonium pentaborate, and ammonium bifluoride) or acids (e.g., $H_3PO_3$, $H_3BO_3$) that contain ions that are to be incorporated into the gel. The aqueous medium may also contain suspended particles such as fumed silica (exemplarily, 8–50% by weight fumed $SiO_2$ of surface areas typically in the range 100–300 $m^2$/gm) that are to be incorporated into the vapogel. The pH of the aqueous medium may be adjusted by addition of a minor amount of a simple acid such as HCl. The aqueous medium typically is at or near room temperature, but may be cooled or heated lightly if so desired, and advantageously is agitated during gas introduction. The rate of gas introduction is believed not to be critical. Illustratively, we have used rates of 1–50 gms/min $SiO_2$ equivalent to form high silica gels.

Vapogel-derived particles (bodies) can be dried (e.g., by heating to about 150° C., the vaporization temperature of HCl), and the resulting porous particles (bodies) fired to consolidate the porous particles (bodies) into homogeneous (i.e., essentially pore-free) glass particles (bodies). Firing can take place in air or, preferably, at least partly in a chlorine- and/or fluorine-containing dehydration atmosphere.

A homogeneous glass body, e.g., a preform from which an optical fiber can be drawn by a known process, can be produced from the consolidated or unconsolidated particles by any suitable process. a currently preferred process is plasma fusion, as exemplified by U.S. Pat. No. 3,954,431, and as further described in concurrently filed U.S. patent application Fleming et al Ser. No. 940,392 filed 12-11-86, entitled "Method for Fabricating Articles Which Include High Silica Glass Bodies and Articles Formed Thereby", incorporated herein by reference. Exemplarily, the particles can be fused to the cylinder surface of a rotating glass rod (produced by any appropriate process, e.g., MCVD, VAD, OVPO) having a refractive index that is greater than that of the glass particles (or having a central high index region surrounded by a peripheral lower index region) resulting in formation of a substantially cylindrical glass body having a core region of relatively larger refractive index that is surrounded by a cladding region of relatively smaller refractive index. The refractive index of the glass formed by particle fusion need not be constant but can vary in any desired fashion. Such variation can be attained by appropriate variation of the composition of the particles introduced into the fusion region, as will be appreciated by those skilled in the art.

Glass produced by the vapogel process typically is substantially free of bubble formation upon heating of the glass above its consolidation temperature. Since the presence of even a small number of bubbles in a glass body frequently is unacceptable (e.g., in optical components, including optical fiber), and since prior art gel-derived glass frequently experiences substantial bubble formation upon heating of the glass to a temperature substantially above its consolidation temperature, the substantial absence of bubble formation is vapogel-derived glass is considered to be a significant aspect of the invention.

We have also discovered that the introduction of liquid $SiCl_4$ into an aqueous medium, can result in formation of a monolithic gel that can be processed in substantially the same manner as vapogel to produce a glass body. Use of a less acidic medium typically results in more rapid gelation, as does a decrease in the $H_2O/SiCl_4$ ratio. For practical reasons, we currently prefer a ratio of at least 30, and a pH<1. The optimal ratio depends somewhat on sol volume and mixing conditions.

DETAILED DESCRIPTION

Figure 1:
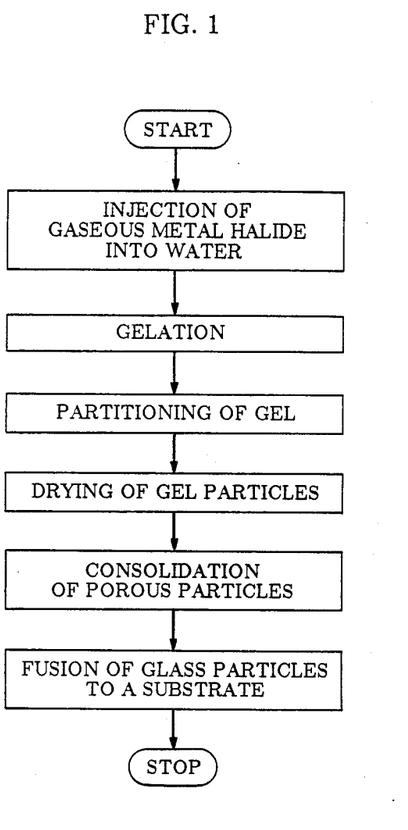
FIGS. 1 and 2 are schematic representations of exemplary embodiments of the inventive process.

FIG. 1 schematically shows the principal steps in an exemplary embodiment of the inventive glass-forming process. The exemplary gaseous silicon halide (e.g., gaseous $SiCl_4$), prepared, for instance, by bubbling $O_2$, Ar, or other carrier gas through semiconductor grade redistilled liquid $SiCl_4$ in a known manner, is continuously injected (together with carrier gas) into the aqueous medium, e.g., distilled room temperature water in a suitable container. At some characteristic composition, the viscosity of the resulting sol increases (typically within seconds) from, e.g., about 0.01 to more than about $10^7$ poise, and gelation occurs. The resultant elastic gel may then be partitioned, e.g., by removing the gel body from the container and pushing it through a noncontaminating screen, resulting in particles that have a relatively narrow size distribution. The gel particles are then dried, e.g., by heating to at least about 150° C. in a slight vacuum. Drying typically produces considerable shrinkage of the particles, with the resulting dry porous particles typically being about $\frac{1}{3}$-$\frac{1}{2}$ of the linear size of the gel particles. The dry porous particles may then be consolidated, e.g., by placing them into a refractory container and heating them to a temperature above (e.g., by about 150°-300° C.) $T_g$, the glass transition temperature. An exemplary temperature range for high silica glass is 900°-1400° C. Consolidation may result in a small further size decrease of the particles, and typically does not produce significant agglomeration of particles. The thus produced homogeneous glass particles are then fused to form a glass body. For instance, the particles can be loaded into a feeder and fused into a glass boule by means of a plasma torch. Vapogel-derived dry porous particles may also be fused to a glass body, or fused in a crucible and extruded therefrom, thus eliminating the particle consolidation step.

Figure 2:
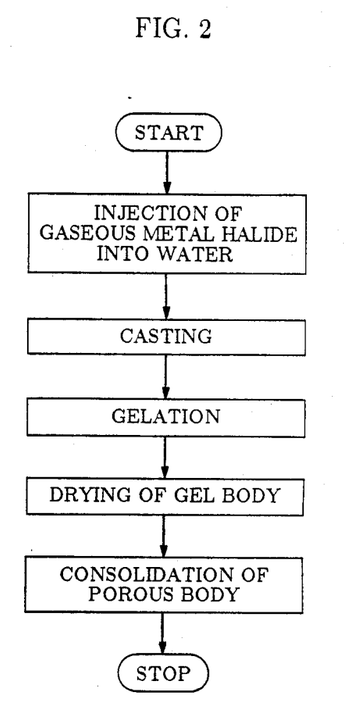

Other embodiments of the vapogel glass-forming process are also contemplated, and one such further embodiment is schematically depicted in FIG. 2. After injection of the gaseous metal halide(s) into the aqueous medium, the thus produced sol is cast into an appropriate mold and permitted to gel in the mold. When the gel has attained the desired mechanical properties, the gel body is removed from the mold, dried and consolidated. Since shrinkage during drying and consolidation typically is substantially isotropic, the shape of the thus produced glass body is substantially the same as that of the gel body. As will be appreciated by those skilled in the art, due care has to be exercised during drying and consolidation to prevent fracturing of the body.

Figure 3:
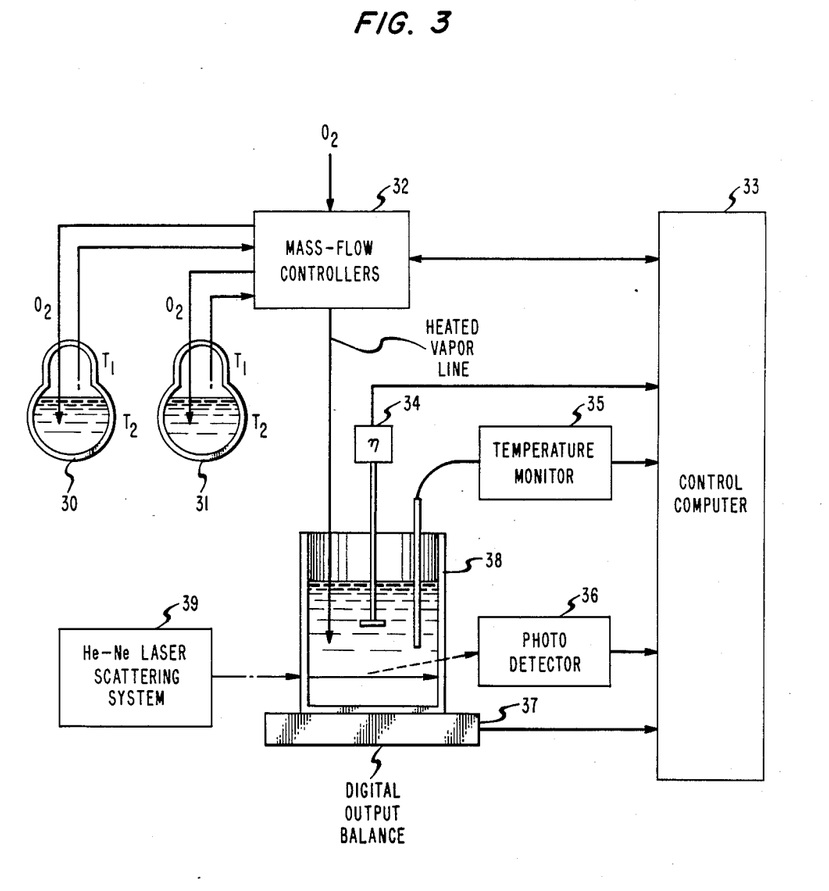
FIG. 3 schematically depicts an exemplary embodiment of the vapogel process.

FIG. 3 schematically depicts the principal process steps of an exemplary embodiment of the vapogel process. Oxygen is introduced at a controlled rate into bubblers 30 and 31 by means of mass flow controller 32. The bubblers contain liquid $SiCl_4$ and $GeCl_4$, respectively, maintained at an appropriate temperature $T_2$ (not necessarily the same for both bubblers). Each bubbler has a condenser section, maintained at a temperature $T_1 < T_2$ which insures that no liquid enters the heated vapor lines leading from the bubblers to 32. The flow meters in 32 are under control of computer 33, which receives inputs from one or more of the following: the controller 32, viscosity measuring means 34, temperature monitoring means 35, scattered light detection means 36, and balance 37. The metered flows of $O_2 + SiCl_4$ and $O_2 + GeCl_4$ are introduced into a heated vapor line that conducts the gas mixture to water-containing vessel 38. The water has some appropriate initial temperature (e.g., 20° C.) but the temperature typically rises during introduction of the precursor gases, unless cooling means are provided. The sol typically is agitated during precursor introduction, by means not shown, to facilitate homogenization. The reaction can be monitored with light scattering means (comprising, exemplarily, He-Ne laser 39 and the scattered light detector 36) and/or with viscosity measuring means (e.g., a Brookfield viscometer). Determining the mass accretion of the sol by means of a balance can give further useful process information.

It is one of the major virtues of the inventive vapogel process that it can produce gels (and therefore gel-derived glass) of compositions unattainable by prior art polymerization gel processes. For instance, by appropriately adjusting the proportion of $SiCl_4$ and $GeCl_4$ in the injected gas we have produced glasses ranging in composition from 100% $SiO_2$ to more than 70 mol% $GeO_2$, remainder $SiO_2$.

The aqueous medium can be pure $H_2O$, or slightly acidified water (e.g., 0.5 ml HCl/100 ml $H_2O$). Presently, it is not considered useful to have a basic aqueous medium. Furthermore, the aqueous medium may comprise one or more metal salts or metal-containing acids dissolved therein. For instance, we have produced aluminosilicate glass (Al-content > 5% mol%) by injecting $SiCl_4$ gas into water in which $AlCl_3$ was dissolved. The aqueous medium may also contain pre-existing colloidal particles (e.g., fumed $SiO_2$), may be at room temperature, cooled to any temperature above the freezing point of the medium, or even heated slightly. Typically, it is advantageous to stir or otherwise agitate the medium during gas injection, to insure rapid and homogeneous hydrolysis.

The rate of metal halide injection was found to be not critical. In one series of experiments we have injected $SiCl_4$ into 100 ml water at rates varying from 1 to 15 gm/min $SiO_2$ equivalent without detectable change of the amount of $SiO_2$ which was incorporated in the gel. We have also injected $SiCl_4$ at rates as high as 50 gm/min $SiO_2$ equivalent into 3000 ml water and achieved normal gelation, and we believe that even higher relative injection rates are possible.

Injection can be continued until gelation occurs, or it can be terminated prior to gelation. In the former case, we have observed that, in many cases, gelation occurs when the $H_2O/SiO_2$ ratio is about 30 mols/mol. In the latter case gelation occurs after a time that generally depends on, inter alia, the composition of the sol, the temperature, and the surface atmosphere.

Gelation generally is substantially independent of batch size, all other relevant factors being equal. Thus, we believe that quite large quantities (e.g., > 20 l) of gel can be produced in one batch. If gas delivery systems of sufficient capacity are available, such quantities of gel can be produced in times as short as a few minutes. For instance, with continuous injection to gelation, about 2200 gm of SiO$_2$ equivalent are required to produce 20 l of vapogel. If the gas delivery system injects the gas at a rate of 550 gm/min SiO$_2$ equivalent then gelation will occur after only about 4 minutes.

Figure 4:
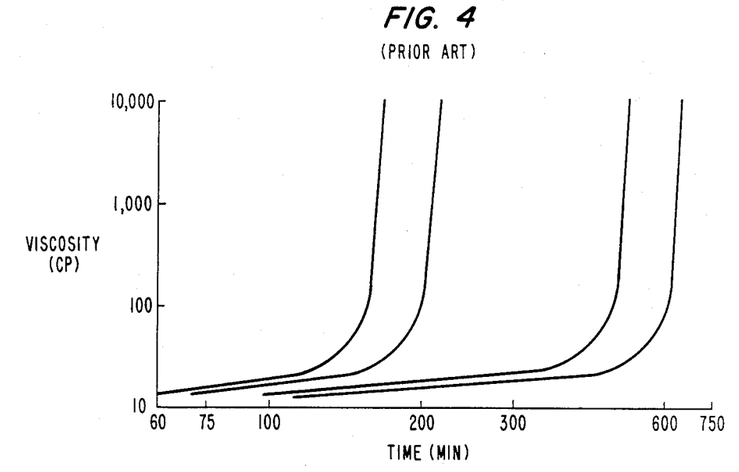
FIG. 4 shows viscosities as a function of time for an exemplary prior art gelation process.

Gel formation is accompanied by increasing viscosity of the sol. FIG. 4 shows exemplary plots of viscosity vs. time for a representative prior art sol-gel process, namely, formation of a silica gel by means of the alkoxide process involving mixing TEOS, ethanol, and water. The variable in FIG. 4 is pH, with longer gel times correspoonding to a more acidic solution.

Figure 5:
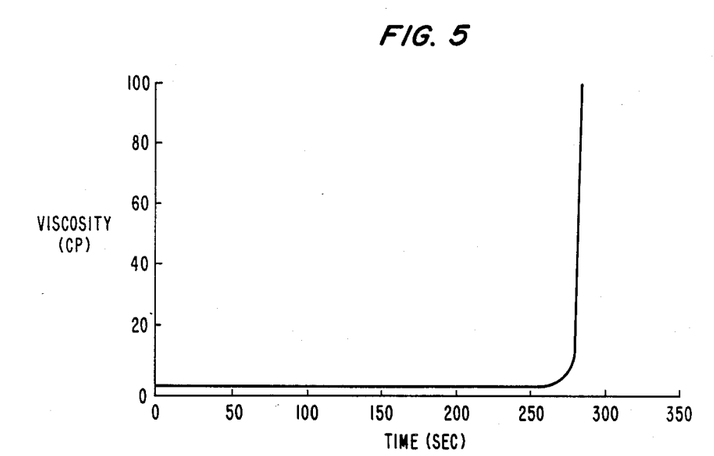
FIG. 5 shows the viscosity as a function of time for an exemplary embodiment of the inventive gelation process.

FIG. 5 exemplarily shows viscosity vs. time for a particular embodiment of the vapogel process, in which SiCl$_4$ was injected into 100 ml H$_2$O (containing 0.5 ml HCl) at a rate of about 10 gms SiO$_2$ equivalent/minute. The viscosity increased within a few seconds from about 0.01 poise to more than $10^7$ poise, with gelation occurring less than 5 minutes after the start of gas injection. This is to be compared with the processes of FIG. 4, in which gelation time typically is hours. The short gelation times that are achievable with the inventive process are of economica significance and are considered to be an important aspect of the inventive process.

Immediately after gelation, the gel texture (which may be related to the mechanical strength of the material) may not be suitable for further processing. However, a suitable texture generally is reached within about one hour (typically <6 hours) from the onset of gelation. The gel body typically is then removed from the vessel in which it was formed, and is either dried in bulk or partitioned into particles of an appropriate size and then dried. Drying of appropriately shaped gel bodies can be carried out by known techniques, substantially in the same way prior art monolithic gel bodies are dried.

In currently preferred emboiments of the inventive method, the gel is partitioned into particles of a substantially predetermined size. This can be done by any appropriate technique, including pushing the gel through a screen, rapid drying leading to spontaneous disintegration, and quenching (e.g., in water) of a hot gel body that also leads to spontaneous disintegration. Rapid heating can, inter alia, be by means of microwaves. Particles produced by spontaneous disintegration of the vapogel-produced gel typically have a relatively narrow size distribution, and average size frequently in the range 0.5-1 mm.

It is currently believed that these advantageous attributes of vapogel-produced gel are at least in part a consequence of the mechanical properties of the gel. In particular, vapogel-produced gel bodies typically are mechanically relatively weak (i.e., having a breaking stress in the range from about $1 \times 10^4$ to about $5 \times 10^6 N/m^2$), and are substantially elastic (i.e., application, and subsequent removal, of a stress equal to 90% of the breaking stress of a body results in a corresponding permanent strain [a strain which persists for at least 2 hours] of no more than about 10%). Furthermore, the volumetric porosity of the dried gel typically is in the range from about 10% to about 90%, with pore sizes in the dried gel typically such as to yield a surface area in the range from about 10 m$^2$/gm to about 1000 m$^2$/gm. Details about the significance of these characteristics are contained in the above referred to concurrently filed, co-assigned U.S. patent application Fleming et al Ser. No. 940,392, 12-11-86.

The gel is dried by some appropriate technique, such as heating in a furnace, in air, in an inert atmosphere (e.g., Ar, He), or under partial vacuum. Exemplarity, the drying program comprises maintaining the gel particles (or gel body) at a temperature in the range 150°-300° C. in a partial vacuum.

The porous dried particles (or porous dried body) can then be consolidated into homogeneous glass particles (or into a homogeneous glass body). Consolidation temperatures may depend on the material composition. For instance, SiO$_2$ particles advantageously are consolidated at temperatures in the range 900°-1400° C., whereas SiO$_2$-based particles that contain GeO$_2$ advantageously are consolidated in the range 900°-1200° C.

As will be appreciated by those skilled in the art, for at least some applications (e.g., optical fiber), it is desirable to remove essentially all adsorbed water molecules and hydroxyl ions (OH) from the material. Typically, this is accomplished by exposing the heated porous material to a Cl$_2$-containing atmosphere in a known manner. Such dehydration treatment frequently is (but need not be) combined with consolidation.

The vapogel-derived dry porous particles or homogeneous glass particles can be used, in a known manner, as feedstock for producing a glass body, e.g., an optical fiber preform. See, for instance, co-assigned U.S. Pat. No. 3,954,431, incorporated herein by reference, which discloses a particularly advantageous technique, namely, a technique that uses a plasma as heat source, and the previously cited concurrently filed U.S. patent application. Techniques based on the use of a combustion heat source (e.g., O$_2$-H$_2$ flame) are possible, but are not preferred for the manufacture of the core and adjacent region of preforms for low loss optical fiber.

Figure 6:
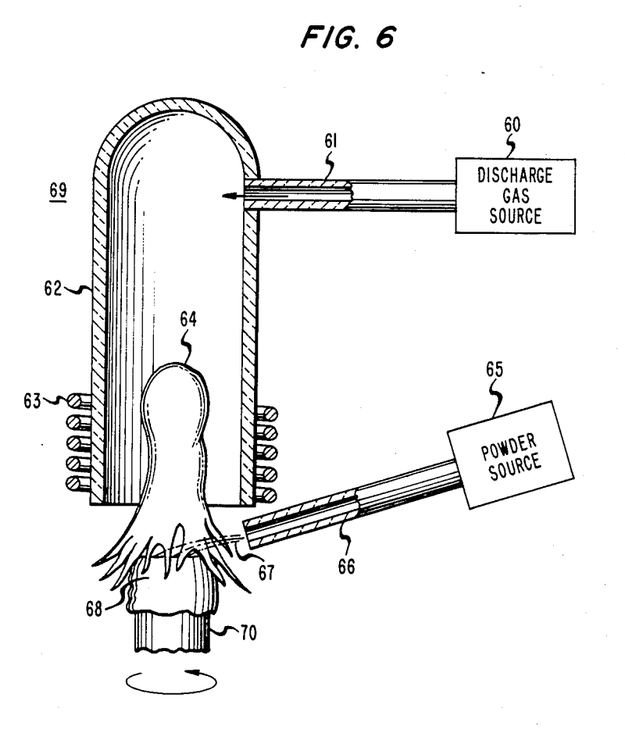
FIGS. 6 and 7 schematically depict exemplary apparatus for producing a glass body such as an optical fiber preform.

FIG. 6 schematically depicts exemplary apparatus for forming a glass body (e.g., an optical fiber preform from which an optical fiber can be drawn by a known technique) by fusion of vapogel-derived glass particles in a plasm torch 69. In this exemplary apparatus, the plasma torch comprises a fused silica mantle 62 connected by a tube 61 to a gas source 60 which feeds the gas desired for the plasma discharge 64 into the mantle. The plasma is excited by means of RF coil 63 and an RF generator that is not shown. The particles are directed into the plasma region by a tube 66 from powder source 65, e.g., a vibratory powder feeder which continuously introduces a regulated quantity of powder into a stream of He. The powder-gas stream 67 issuing from 66 is directed at the top portion of the axially forming glass boule 68. Boule formation is started by directing 67 against the top surface of glass bait 70. The bait is supported by means not shown, and is rotated to promote the symmetry of the boule. The bait is lowered so as to keep the position of the top of 68 constant relative to the apparatus.

Figure 7:
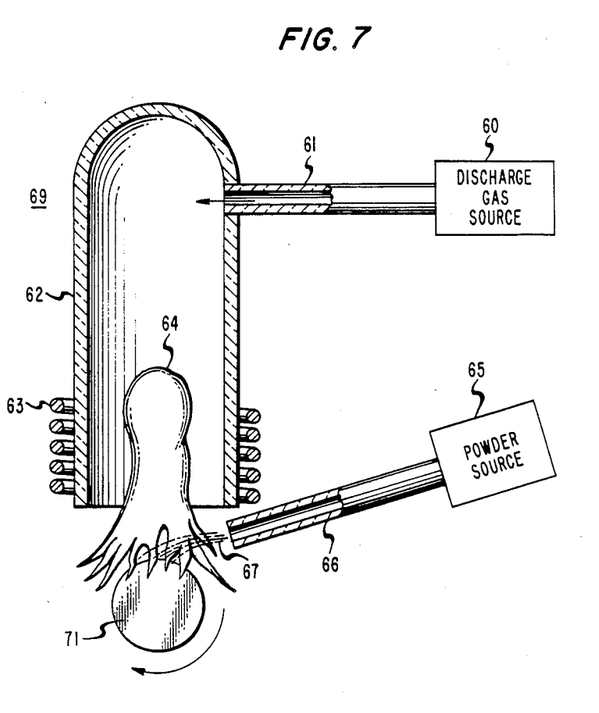

FIG. 7 shows a further exemplary embodiment of apparatus for forming a glass body by fusion of vapogel-derived glass particles by means of a plasma torch. The apparatus is substantially as shown in FIG. 6, except that the gas-particle stream 67 is directed at the circumference of the rotating glass boule 71 and fused thereto. The boule is formed by, e.g., initially providing a glass bait rod, and fusing particles to the circumference of the bait rod. The embodiment of FIG. 7 thus results in formation of a compound boule comprising a preproduced central (e.g., the core of a fiber preform) portion and an overcladding, exemplarily glass of lower refractive index than the central portion.

EXAMPLE 1

A stream of $O_2$ and $SiCl_4$ was introduced into a beaker containing 3500 ml of deionized water. The gas stream was produced by flowing the $O_2$ through a bubbler assembly consisting of a 3000-ml PYREX container with a PYREX condenser. The temperature of the bubbler was set at 57.5° C., and the condenser temperature at 55° C. Heated TEFLON tubing was used to carry the $SiCl_4$-containing gas stream. The $SiCl_4$ flow rate was approximately 1000 cc/min. The water in the beaker was initially at room temperature, was being stirred with a TEFLON-coated stirbar, and was open to the atmosphere. A He-NE laser beam was directed horizontally through the contents of the beaker, and a silicon photodetector was placed at 90° to the beam, to detect light scattered in the sol. The intensity of the scattered light was monitored by means of a lock-in amplifier, gelation being indicated by a very rapid rise in the detected intensity. Gelation occurred in less than eight minutes. The gas flow was terminated at gelation. The temperature of the sol at gelation was about 70° C. After aging of the gel for about two hours (during which time the mechanical strength of the gel increased), the gel was removed from the beaker and grated by means of an 18-mesh TEFLON screen. The resulting gel particles were placed in a PYREX jar and dried at 250° C. for about six hours in a partial vacuum. This resulted in removal of essentially all water from the gel particles, and shrinkage such that the post-drying average linear particle size was about 0.5 mm. The total weight of the $SiO_2$ particles was about 180 gm. The particles were consolidated by firing in air in an electric resistance furnace for two hours at 1350° C. The resulting glass particles were essentially bubble-free, and the size distribution remained substantially unchanged. Substantially no agglomeration occurred. A glass body was produced by plasma fusing the glass particles to a rotating horizontal fused silica bait rod, in a manner substantially as depicted in FIG. 7.

EXAMPLES 2–13

The composition of the glasses (in mol% of the oxide formed from the given precursor) produced in Examples 2–13 are listed in Table I. The procedure for forming the glass particles in Examples 2, 3 and 5 was substantially as described in Example 1, except as noted below. The thus formed glass particles are plasma fused to a vertical bait rod substantially as depicted in FIG. 6.

In Example 2, a $GeCl_4$ bubbler was also provided. The $GeCl_4$ bubbler temperature was 64° C., the condenser temperature was 56° C., the flow rates were such that the combined metal chloride flow rate was about 1000 cc/min, and the consolidation temperature was 1100° C.

In Examples 3 and 5, the $AlCl_3$, and $AlCl_3$ and NaCl, respectively, were dissolved in the deionized water prior to the introduction of the $O_2/SiCl_4$ gas into the water.

The procedure to be used in forming the glasses of Examples 4, and 6–13 is substantially as described in Example 1, except as noted below.

TABLE I

| Example No. | Precursor | | | | | | | | | |
|---|---|---|---|---|---|---|---|---|---|---|
| | SiCl$_4$ | SiF$_4$ | GeCl$_4$ | TiCl$_4$ | SnCl$_4$ | AlCl$_3$ | NaCl | NH$_4$B$_5$O$_8$H$_2$O | H$_3$PO$_3$ | H$_3$BO$_3$ |
| 2 | 20 | | 80 | | | | | | | |
| 3 | 80 | | | | | 20 | | | | |
| 4 | 95 | | | | 5 | | | | | |
| 5 | 75 | | | | | 20 | 5 | | | |
| 6 | 85 | | | | | 10 | | 5 | | |
| 7 | 91 | | 4 | | | | | | 5 | |
| 8 | 95 | | | 5 | | | | | | |
| 9 | 95 | | | | | | 5 | | | |
| 10 | | 100 | | | | | | | | |
| 11 | 96 | | | | | | 4 | | | |
| 12 | 84 | | 1 | | | | | | | 15 |
| 13 | 95 | | | | | | | | 5 | |

In Examples 6, 7, 9, 11, 12 and 13, the precursors other than $SiCl_4$ (and $GeCl_4$, where appropriate) are dissolved in the deionized water prior to introduction of the $O_2/SiCl_4$ gas into the water.

In Examples 7 and 12, a $GeCl_4$ bubbler as described in Example 2 is used, and the consolidation temperature is 1100° C.

In Example 10, all PYREX vessels are replaced by TEFLON-coated vessels.

EXAMPLE 14

A silica glass body is produced substantially as described in Example 1, except that the particles are not consolidated prior to being fed into the plasma flame.

EXAMPLE 15

A silica glass body is produced substantially as described in Example 1, except that about 1500 gms of colloidal fumed silica (surface area about 200 m$^2$/gm) are suspended in the 3500 ml deionized water prior to introduction of the $SiCl_4$ gas.

EXAMPLE 16

On the inside of a commercial 46 by 50 mm fused silica substrate tube is deposited (by plasma-assisted MCVD) in a known manner pure silica cladding material and germania-doped silica core material such that, after collapsing the tube, a 22.6 mm diameter glass rod with a step index profile ($\Delta = 0.8\%$, core diameter about 3.2 mm deposited cladding diameter about 12.8 mm) results. Fused silica particles (average size 0.5 mm), produced substantially as described in Example 1, are fused to the thus produced glass rod by means of an RF plasma torch, in a manner generally as depicted in FIG. 7, such that a 50 mm diameter preform results. From the thus produced preform single mode optical fiber (125 μm diameter, 8 μm core diameter) is drawn in a known manner. The fiber has loss below 1 dB/km at 1.3 μm.

What is claimed is:

1. A method of producing a silica-containing glass body, the method comprising
    (a) forming a silica-containing gel by a process that comprises introducing a gas stream into an aqueous liquid medium, the gas stream comprising an effective concentration of gaseous silicon halide, such that the silica-containing gel is formed; and (b) producing at least a portion of the silica-containing glass body from the gel.

2. Method of claim 1, comprising selecting the gaseous silicon halide from the group consisting of $SiCl_4$ and $SiF_4$.

3. Method of claim 1, wherein the gas stream comprises a gas selected from the group consisting of $SnCl_4$, $TiCl_4$, $ZnCl_4$, $PbCl_2$, $SbCl_3$, $GeCl_4$, $BCl_3$, and $PCl_3$.

4. Method of claim 1, comprising dissolving at least one member of the group consisting of $AlCl_3$, Nacl, $NH_4B_5O_8 \cdot H_2O$, $H_3PO_3$, and $H_3BO_3$ in the aqueous medium.

5. Method of claim 1, wherein the aqueous liquid medium comprises pre-existing colloidal particles.

6. Method of claim 5, wherein the aqueous liquid medium comprises fumed silica.

7. Method of claim 1, comprising introducing the gas stream into the aqueous liquid medium until the gel is formed.

8. Method of claim 1, comprising producing substantially dry porous first particles from the gel.

9. Method of claim 8, comprising consolidating the first particles into glass particles.

10. Method of claim 9, comprising fusing the glass particles to a glass substrate.

11. Method of claim 8, comprising fusing the first particles to a glass substrate.

12. Method of claim 8, comprising forming the first particles by a process that comprises partitioning the gel such that gel particles having a relatively narrow size distribution are formed, and further comprising substantially drying the gel particles.

13. Method of claim 12, comprising partitioning the gel by a process that comprises rapidly heating the gel such that the gel disintegrates into gel particles, and further comprising substantially drying the gel particles.

14. Method of claim 12, comprising partitioning the gel by a process that comprises heating and quenching the gel such that the gel disintegrates into gel particles, and further comprising substantially drying the gel particles.

15. Method of claim 12, comprising partitioning the gel by mechanical partitioning means.

16. Method of claim 1, comprising producing substantially dry porous material from the gel, melting the porous material, and extruding the molten material from a crucible.

17. Method of claim 8, wherein producing the glass body from the gel further comprises contacting the first particles with an atmosphere that comprises $Cl_2$.

18. Method of claim 1, wherein producing the glass body from the gel comprises forming a gel body, substantially drying the gel body, whereby a porous body is formed, and consolidating the porous body, such that the glass body results.

19. Method of claim 1, wherein producing the silica-containing glass body comprises drawing an optical fiber from a glass intermediate body.

20. Method of producing an optical fiber comprising
 (i) producing an optical fiber preform by a process that comprises
  (a) introducing a gas stream into an aqueous liquid medium, the gas stream comprising an effective concentration of a gaseous silicon halide, such that a silica-containing gel is formed from the aqeous liquid medium;
  (b) producing substantially dry particles from the gel; and
  (c) fusing the particles to a glass rod comprising a core region of relatively higher refractive index and a cladding region of relatively lower refractive index surrounding the core region; and
 (ii) drawing the optical fiber from the preform.

21. Method of claim 20, wherein (a) is carried out such that the gel has a breaking strength in the range from about $1 \times 10^4$ to about $5 \times 10^6 N/m^2$ and is substantially elastic, and wherein the volumetric porosity of the dry particles is in the range 10–90%, with pore size in the dry particles such as to yield a surface area in the range 10–1000 $m^2/gm$.

* * * * *